United States Patent [19]

Van Hoey et al.

[11] Patent Number: 5,759,323
[45] Date of Patent: Jun. 2, 1998

[54] PROCESS FOR THE MANUFACTURE OF A PRODUCT MADE OF A FIBER-REINFORCED COMPOSITE MATERIAL

[76] Inventors: Marc Van Hoey, Jovastraat 2, B-9050 Gentbrugge, Belgium; Dieter Wagner, Karl Armbrusterstrasse 2, D-79805 Eggingen, Germany; Willy De Meyer, J.B. d'Hanedreef 8, B-9031 Drongen, Belgium

[21] Appl. No.: 687,455

[22] PCT Filed: Dec. 2, 1994

[86] PCT No.: PCT/EP94/04022

§ 371 Date: Oct. 9, 1996

§ 102(e) Date: Oct. 9, 1996

[87] PCT Pub. No.: WO95/15844

PCT Pub. Date: Jun. 15, 1995

[30] Foreign Application Priority Data

Dec. 6, 1993 [DE] Germany ............. 43 41 521.0

[51] Int. Cl.[6] ............................ B29C 70/52; B29B 15/10
[52] U.S. Cl. ........................ 156/149; 138/125; 156/244.13; 156/309.6
[58] Field of Search ......................... 156/149, 309.6, 156/244.13, 166, 180; 138/123, 124, 125; 264/103

[56] References Cited

U.S. PATENT DOCUMENTS

| | | | |
|---|---|---|---|
| 3,049,762 | 8/1962 | Jackson | 156/149 |
| 3,633,629 | 1/1972 | Rider | 156/149 |
| 3,982,982 | 9/1976 | Chudgar | 156/149 |
| 4,276,908 | 7/1981 | Horne | 138/125 |
| 5,114,516 | 5/1992 | Pilling | 156/180 |
| 5,264,060 | 11/1993 | Lambing | 156/180 |
| 5,409,651 | 4/1995 | Head | 156/180 |
| 5,451,209 | 9/1995 | Ainsworth | 604/282 |

FOREIGN PATENT DOCUMENTS

| | | |
|---|---|---|
| 133893 | 3/1985 | European Pat. Off. . |
| 402309 | 12/1990 | European Pat. Off. . |
| 2165470 | 7/1973 | Germany . |
| 900769 | 7/1962 | United Kingdom . |
| 2259044 | 3/1993 | United Kingdom . |

*Primary Examiner*—Daniel Stemmer
*Attorney, Agent, or Firm*—Terry T. Moyer; James M. Robertson

[57] ABSTRACT

In a process that is particularly suitable for producing pipes or hoses, the reinforcing material and the matrix material are no longer produced separately but together in a woven, knitted, braided or non-woven fabric. The matrix material is selected so that its melting temperature is lower than the melting or decomposition temperature of the reinforcing material. The end product is obtained by pultruding the fabricated material, generally designated as textile fabrics, at a temperature above the melting temperature of the matrix material and below the melting or decomposition temperature of the reinforcing material. The product is then cooled to stabilise its final shape.

6 Claims, No Drawings

PROCESS FOR THE MANUFACTURE OF A PRODUCT MADE OF A FIBER-REINFORCED COMPOSITE MATERIAL

The subject matter of this invention concerns a process for the manufacture of a product, especially of a pipe or hose, made of a fiber-reinforced composite material.

A number of processes for the manufacture of products made of fiber-reinforced composite materials are known. In the hand lay-up process, the final product is manufactured by manually positioning resin and glass-fiber mats or glass-fiber fabrics in a wooden, synthetic, or metal mold. Due to the high manual labor cost, this process is generally suitable only for the production of single parts or a small number of pieces. The only smooth surface of the final products that are manufactured by means of the hand lay-up process is the surface that faces the mold.

Rotationally symmetrical molded articles, such as pipes and containers, are frequently produced by means of filament process. In this process, a winding machine is used to wind textile glass mats, fabrics or rovings and resin around a metal mandrel. Again, this process produces an optimally smooth surface only on the inside surfaces of the wound components. This filament winding process is also labor-intensive, which means that the cost of producing the finished products is high.

For large lots, hot press molding of prepregs (SMC) or compression molding materials (BMC) is known. In this process, coating blanks of thickened mixtures of resin, glass, and fillers are positioned in heated surface-hardened steel molds and cured at an elevated temperature (approximately 120° C. –150° C.) under pressure. Due to the batchwise operation, hot press molding entails relatively high labor costs.

To produce large-area components made of a fiber-reinforced composite material, the injection process can be used. In this process, the precisely cut-to-size reinforcing material is positioned in a mold, the upper surface of which is covered by a countermold. The mold that contains the reinforcing material is subsequently evacuated; next, resin is introduced, in most cases to the deepest point of the mold, and sucked through the laminate up to the rim. Again, this process is carried out in batches and entails relatively high labor costs.

A continuous process that can be suitably used for the production of fiber-reinforced synthetics is the so-called pultrusion process. In pultrusion, the reinforcing material that is saturated with resin is continuously pulled through a heated die with the desired sectional shape, which die sets the final shape of and cures the product. This process, however, has a number of drawbacks: The matrix material, in most cases a resin, must be liquid so that the reinforcing material can be-saturated with it. Thus, the selection of the matrix material is restricted to certain liquefiable resins. As a rule, the resins that are used as the matrix material are liquefied with a solvent that is released during the curing process and which is detrimental to the environment. Furthermore, the application of the matrix material, which takes place by saturating the reinforcing material with the matrix material, leads to a nonhomogeneous distribution on the reinforcing material, as a result of which the properties of the final product vary. The speed of the pultrusion process is limited by the ability of the matrix material to penetrate the reinforcing material and by the viscosity of the matrix material. In addition, the pultrusion rate is limited by the forces that are exerted on the matrix material during the heating and molding process since excessively high tensile forces would destroy the structure of the reinforcing material and of the matrix material.

In all processes mentioned above, a thermally curable material, in most cases a synthetic resin, is used as the matrix material.

To process glass-fiber reinforced thermoplastics, the well-known injection molding process can be used. The starting material is a granular material with enclosed short glass fibers. The granules are dissolved by heat and an extruder is used to press the material into the injection mold desired. This process is unsuitable for composite materials in which the reinforcing material used is a woven or knitted fabric, a scrim, a plaited fabric, a nonwoven or a similar fabric of this type.

Thus, the problem to be solved by this invention is to develop a process for the manufacture of a product made of a fiber-reinforced composite material which can be carried out faster and thus more economically than previously employed processes, which meets more stringent environmental control regulations, and which allows the manufacture of a wide variety of products. In particular, the goal is to develop a process for the production of pipes or hoses made of a fiber-reinforced composite material.

According to this invention, this problem is solved by a process that has the characteristics as described herein. Useful embodiments and further developments of the process according to this invention are characterized in the subordinate claims.

In contrast to the well-known processes in which the reinforcing material is a woven or knitted fabric, a scrim, a plaited fabric, a nonwoven or a similar fabric of this type, the matrix material used in the process according to this invention is not a thermosetting material but a thermoplastic material. In the process according this invention, the solvents so far required to liquefy the matrix material need not be used and require no substitutes. Instead, the matrix material, which may be a thermoplastic polymer material or another material that melts above a certain temperature, is provided in solid form in the woven or knitted fabric, the scrim, the plaited fabric, or the nonwoven fabric of the reinforcing material. This can be achieved, for example, by weaving, plaiting, knitting or otherwise combining the matrix material in the form of fibers, filaments or yarns with fibers, filaments or yarns of the reinforcing material. In addition, to produce the woven or knitted fabric, the scrim, the plaited or a similar fabric, it is also possible to use a yarn that contains the reinforcing material as well as the matrix material. Special advantages can be attained by using a yarn that consists of a core of reinforcing material that is wrapped with or cocooned in the matrix material. The only important consideration is to ensure that the melting temperature of the reinforcing material is above the melting temperature of the matrix material. Thus, according to this invention, the reinforcing material in combination with the matrix material is made available in a form known by the generic term of "textile fabrics."

The woven or knitted material, the scrim, the plaited fabric, the nonwoven, or a similar material of this type can be further processed by pultrusion without any pretreatment as long as the temperature in the pultrusion step is above the melting temperature of the matrix material and below the melting or decomposition temperature of the reinforcing material. The temperature in the pultrusion step is preferably markedly lower than the melting or decomposition temperature of the reinforcing material.

After conclusion of the pultrusion step, the product that has been placed into the desired mold is cooled to set its shape. The final product consists of a closed matrix that contains the reinforcing material.

Prior to cooling the product that was obtained by pultrusion, it is still possible to influence its shape. For example, after fiber-reinforced sectional shapes have been pultruded, they can be bent, as desired, and their shape can be subsequently set by cooling.

The process according to this invention has a number of advantages.

Matrix materials to be used include all materials with a melting temperature that is lower than the melting or decomposition temperature of the reinforcing material used. The matrix material as well as the reinforcing material may consist of several components. Since the matrix material and the reinforcing material together are made available in the form as claimed in this invention, a uniform and homogeneous distribution of the matrix material in the final product is ensured. Since there is no need for the reinforcing material to be saturated with a matrix material, thus altogether obviating a processing step, only the heat absorption capacity of the woven or knitted fabric, the scrim, the plaited fabric, the nonwoven or a similar fabric of this type limits the pultrusion rate, which makes it possible to increase the conventional pultrusion rate of approximately 0.5 to 1.5 m/min so far used to a three to five times higher value.

The process according to this invention can be usefully extended by applying an additional layer of a desired material by means of an extrusion step to one or both surfaces of the pultruded product. Preferably, this material is a thermoplastic material. In this manner, it is possible to produce, for example, hoses or pipes in which the inside and/or outside is covered by an additional layer of a thermoplastic material.

Furthermore, it is also possible to use an extrusion step during which a layer of a filling material, e.g., a layer of sand, is applied onto the pultruded product, which layer of filling material can be subsequently covered with a layer of thermoplastic material. This allows an extremely economical manufacture, for example, of fiber-reinforced radiator hoses for automotive vehicles, which have a very smooth outer surface and thus satisfies stringent requirements. Also, the first pultrusion step can be followed by a second pultrusion step.

The process according to this invention also makes it possible to produce heavy-duty pipes or hoses by applying another layer of reinforcing material onto the outer surface of a pipe or hose that has been pultruded as described by this invention by plaiting, knitting or winding this material around the pipes or hoses, which layer can be subsequently covered in an extrusion step by a layer of thermoplastic material. This second layer of reinforcing material can be suitably pretreated prior to the extrusion step, for example, by wetting it or by dipping it into a liquid for the purpose of improving the adhesion between the layers.

The selection of suitable materials is not limited to polymer materials but may include metals, such as lead or copper, which, depending on the melting temperature of the other component that is contained in the woven or knitted fabric, the scrim, the plaited fabric, the nonwoven or a similar fabric of this type according to this invention, can be used either as the reinforcing material or as the matrix material.

Below, a number of examples are offered which show that using the process according to this invention, it is possible to produce superior products.

EXAMPLE 1

Water pipe for the moderate temperature range

Matrix material:

PVC (melting temperature 50° C. to 110° C.)

Reinforcing material:

Glass (melting temperature 825° C.)

EXAMPLE 2

Water pipe for the low temperature range

Matrix material:

Polypropylene (melting temperature 165° C.)

Reinforcing material:

Polyethylene terephthalate (melting temperature 256° C.)

EXAMPLE 3

Water pipe for moderate temperatures and high pressure.

Matrix material:

Polyethylene terephthalate (melting temperature 256° C.)

Reinforcing material:

Aramid (decomposition temperature 500° C.)

EXAMPLE 4

Sectional shape as a construction element

Matrix material:

Polyethylene terephthalate (melting temperature 256° C.)

Reinforcing material:

Glass (melting temperature 825° C.)

EXAMPLE 5

Material as a protection against X-rays

Matrix material:

Lead (melting temperature 327° C.)

Reinforcing material:

Glass (melting temperature 825° C.)

EXAMPLE 6

Hose with improved bursting resistance

Matrix material:

Polyethylene terephthalate/polyamide-66 copolymer (melting point approximately 260° C.)

Reinforcing material:

Glass/aramid (melting point 825° C. and 500° C., respectively)

EXAMPLE 7

Cable with special sheathing

First, a woven or knitted fabric, a scrim, a plaited fabric, a nonwoven or similar fabric of this type according to this invention is wound or positioned around a cable and subsequently pultruded with the cable. In this manner, it is possible to enclose electrical cables in a made-to-measure sheathing.

We claim:

1. A method for the production of tubes or hoses of a fiber-reinforced compound material comprising the steps of:

(a) forming a textile fabric including a reinforcing material and a matrix material whose melting temperature is lower than that of the reinforcing material, (b) pultruding the textile fabric formed in step (a) through a mold corresponding to the desired end product at a temperature above the melting temperature of the matrix material and below the melting or decomposition temperature of the reinforcing material to form a tube or hose structure, (c) cooling of the tube or hose structure obtained in step (b).

(d) applying an additional layer of reinforcing material to the outer surface of the tube or hose structure by plaiting, knitting, or wrapping, and (e) covering the additional layer of reinforcing material, applied in step (d), with a layer of thermoplastic material by means of extrusion.

2. The method according to claim 1 wherein either said reinforcing material or said matrix material comprises several components.

3. The method according to claim 1, wherein the reinforcing material is comprised of glass.

4. The method according to claim 1, wherein the reinforcing material is polyethylene terephthalate and the matrix material is polypropylene.

5. The method according to claim 1, wherein the reinforcing material is aramid and the matrix material is polyethylene terephthalate.

6. The method according to claim 1, characterized in that the reinforcing material is a mixture of glass and aramid.

* * * * *